(12) United States Patent
Chen et al.

(10) Patent No.: US 10,731,976 B2
(45) Date of Patent: Aug. 4, 2020

(54) OPTICAL SENSING DEVICE AND STRUCTURED LIGHT PROJECTOR

(71) Applicant: LIQXTAL TECHNOLOGY INC., Tainan (TW)

(72) Inventors: Hung-Shan Chen, Tainan (TW); Yen-Chen Chen, Tainan (TW)

(73) Assignee: LIQXTAL TECHNOLOGY INC., Tainan (TW)

( * ) Notice: Subject to any disclaimer, the term of this patent is extended or adjusted under 35 U.S.C. 154(b) by 0 days.

(21) Appl. No.: 16/043,153

(22) Filed: Jul. 24, 2018

(65) Prior Publication Data
US 2019/0101381 A1  Apr. 4, 2019

Related U.S. Application Data

(60) Provisional application No. 62/566,539, filed on Oct. 2, 2017.

(51) Int. Cl.
*G01B 11/25* (2006.01)
*G02B 27/42* (2006.01)
(Continued)

(52) U.S. Cl.
CPC ........ *G01B 11/254* (2013.01); *G01B 11/2513* (2013.01); *G02B 27/4238* (2013.01);
(Continued)

(58) Field of Classification Search
CPC .............. G01B 11/2513; G01B 11/254; G02B 27/4238; G02B 27/4272; G02F 1/133504;
(Continued)

(56) References Cited

U.S. PATENT DOCUMENTS 7,796,219 B2 * 9/2010 Koma ............... G02F 1/133707
349/129
8,870,390 B2 10/2014 Davidson
(Continued)

FOREIGN PATENT DOCUMENTS

CN 1782823 6/2006
CN 102067242 5/2011
(Continued)

OTHER PUBLICATIONS

"Office Action of Taiwan Counterpart Application", dated Jul. 31, 2019, pp. 1-11.
(Continued)

*Primary Examiner* — Tri T Ton
(74) *Attorney, Agent, or Firm* — JCIPRNET

(57) ABSTRACT

An optical sensing device configured to detect an object or features of the object is provided. The optical sensing device includes a structured light projector and a sensor. A structured light projector is configured to project a structured light to the object and includes a light source and at least one tunable liquid crystal diffractive optical element (LCDOE). The light source is configured to emit a light beam. The at least one tunable LCDOE is disposed on a path of the light beam and configured to convert the light beam into the structured light to form a structured light pattern on the object. The LCDOE is capable of controlling the structured light pattern by controlling voltage distribution to a liquid crystal layer in the LCDOE. The sensor is configured to sense a reflected light formed by the object reflecting the structured light. Besides, a structured light projector is also provided.

25 Claims, 10 Drawing Sheets

(51) Int. Cl.
*G02F 1/1335* (2006.01)
*G02F 1/29* (2006.01)

(52) U.S. Cl.
CPC ... *G02B 27/4272* (2013.01); *G02F 1/133504* (2013.01); *G02F 1/29* (2013.01); *G02F 2001/294* (2013.01); *G02F 2203/22* (2013.01)

(58) Field of Classification Search
CPC ... G02F 1/29; G02F 2001/294; G02F 2203/22
USPC .................................................. 356/600–640
See application file for complete search history.

(56) References Cited

U.S. PATENT DOCUMENTS

| | | |
|---|---|---|
| 2011/0019258 A1 | 1/2011 | Levola |
| 2017/0074720 A1 | 3/2017 | Grossinger et al. |
| 2019/0049720 A1* | 2/2019 | Bardagjy ............. G02B 26/106 |

FOREIGN PATENT DOCUMENTS

| | | |
|---|---|---|
| CN | 102334064 | 1/2012 |
| CN | 102483552 | 5/2012 |
| CN | 103245301 | 8/2013 |
| CN | 103605202 | 2/2014 |
| TW | M388658 | 9/2010 |
| TW | 201316095 | 4/2013 |
| TW | 201337422 | 9/2013 |
| TW | 201614189 | 4/2016 |
| WO | 2016024203 | 2/2016 |

OTHER PUBLICATIONS

"Office Action of China Counterpart Application", dated Apr. 2, 2020, p. 1-p. 10.

* cited by examiner 0 degree 90 degree 45 degree

OPTICAL SENSING DEVICE AND STRUCTURED LIGHT PROJECTOR

CROSS-REFERENCE TO RELATED APPLICATION

This application claims the priority benefit of U.S. provisional application Ser. No. 62/566,539, filed on Oct. 2, 2017. The entirety of the above-mentioned patent application is hereby incorporated by reference herein and made a part of this specification.

BACKGROUND

Technical Field

The invention generally relates a sensing device and a light projector, and, in particular, to an optical sensing device and a structured light projector.

Description of Related Art

One of the most important technology for three-dimension (3D) sensing is using structured light method. The structured light method uses an IR source to generate IR. The IR is projected to a diffractive optical element (DOE) to generate a diffraction pattern. The surface contour can be reconstructed by projecting the diffraction pattern to an object and measuring the deformation of the diffraction pattern due to the surface contour of the object by a sensor.

Traditionally, the DOE is not tunable. When the sensing environment changes, the pattern of the structure cannot change accordingly. This may decrease the resolution of the surface contour. In addition, when the DOE has some intrinsic defects due to the manufacturing process, the DOE cannot be adjusted to compensate for its intrinsic defects.

SUMMARY

The invention provides an optical sensing device which uses a simple and effective way to form tunable structured light.

The invention provides a structured light projector which uses a simple and effective way to form tunable structured light.

According to an embodiment of the invention, an optical sensing device configured to detect an object or features of the object is provided. The optical sensing device includes a structured light projector and a sensor. A structured light projector is configured to project a structured light to the object and comprises a light source and at least one tunable liquid crystal diffractive optical element. A light source configured to emit a light beam. The at least one tunable liquid crystal diffractive optical element (LCDOE) is disposed on a path of the light beam and is configured to convert the light beam into the structured light to form a structured light pattern on the object. The LCDOE is capable of controlling the structured light pattern by controlling voltage distribution to a liquid crystal layer in the LCDOE. The sensor is configured to sense a reflected light formed by the object reflecting the structured light.

According to an embodiment of the invention, a structured light projector is provided. The structured light projector comprises a light source, at least one tunable liquid crystal diffractive optical element (LCDOE) and a lens. The light source is configured to emit a light beam. The at least one tunable liquid crystal diffractive optical element (LC-DOE) disposed on a path of the light beam and configured to convert the light beam into the structured light to form a structured light pattern, the LCDOE being capable of controlling the structured light pattern by controlling voltage distribution to a liquid crystal layer in the LCDOE. The lens disposed on at least one of the light beam and the structured light.

Based on the above, the structured light projector provided by one of the embodiments of the invention includes a tunable LCDOE. Since the liquid crystal is tunable by applying external voltages, the LCDOE can generate different diffraction patterns of the structured light. Besides, the structured light projector provided by one of the embodiments of the invention uses the aforementioned structured light projector, and therefore is capable of producing tunable structured light by using a simple and effective way.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
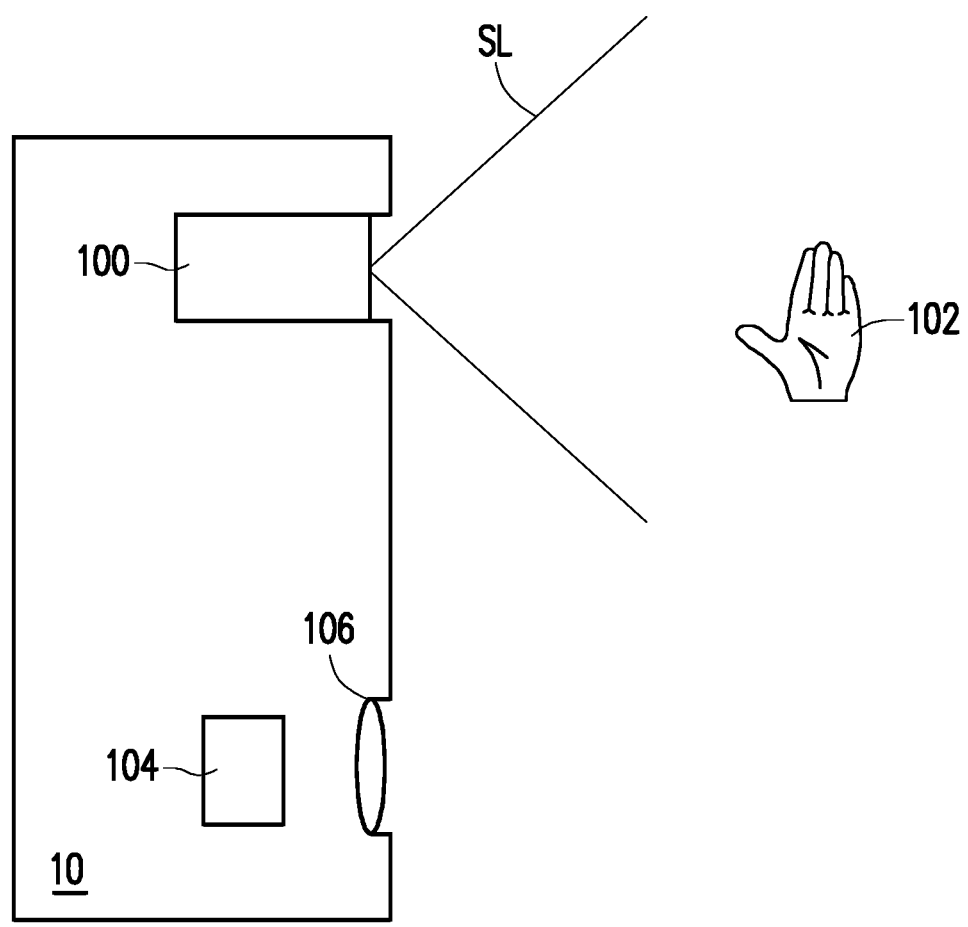
FIG. 1A is a schematic cross-sectional view of an optical sensing device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
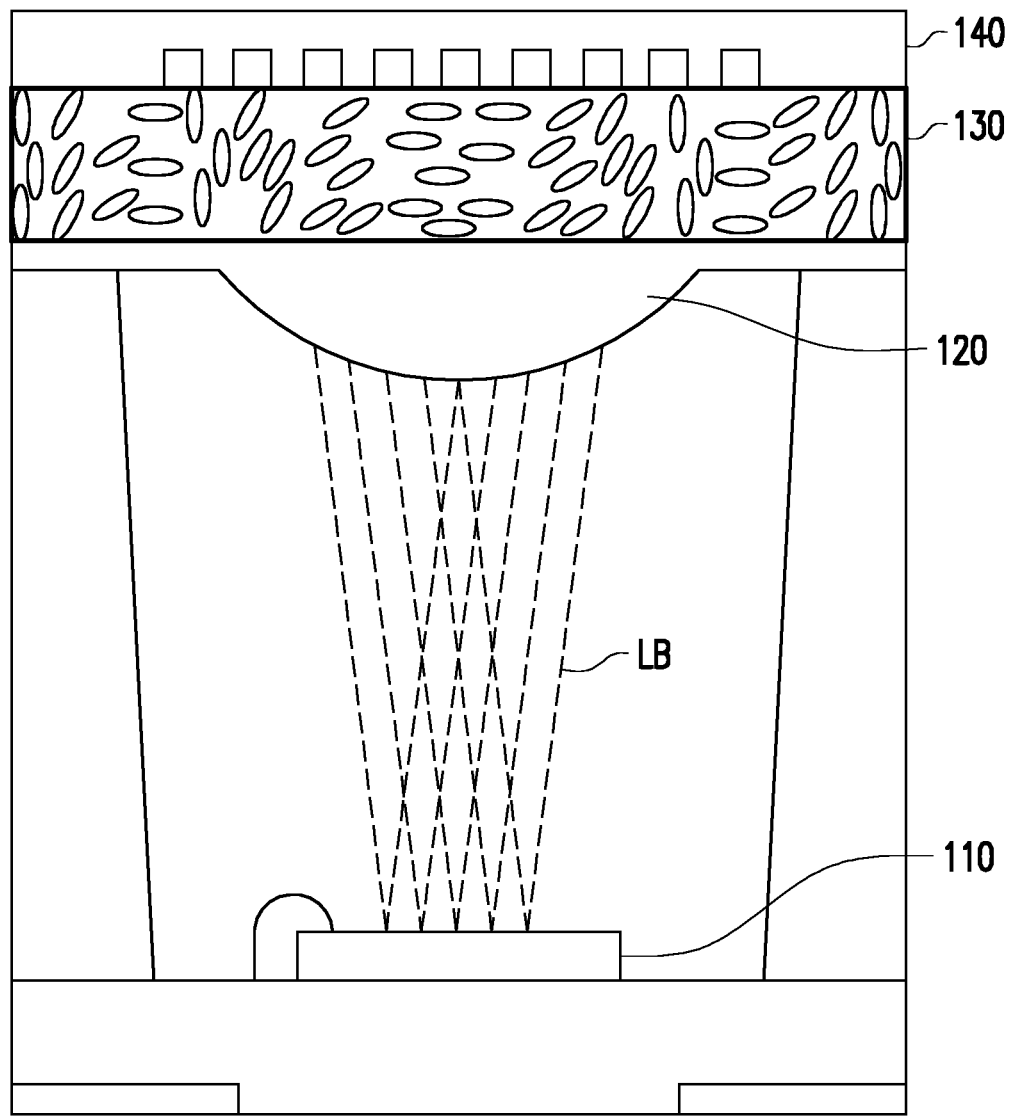
FIG. 1B is a schematic cross-sectional view of a structured light projector of FIG. 1A.

FIG. 1A is a schematic cross-sectional view of an optical sensing device according to an embodiment of the invention. FIG. 1B is a schematic cross-sectional view of a structured light projector of FIG. 1A. Referring to FIG. 1A, an optical sensing device 10 of the present embodiment is configured to detect an object 102 or features of the object 102 by the structured light SL.

In the present embodiment, the object can be a human face, a hand, or any 3D object with surface contours. When the structured light SL shines on the object 102, the light pattern on the object 102 deforms due to the surface contour and the structured light is reflected by the object. When the reflected structured light SL is detected by the sensor 104, the optical sensing device 10 can use the detected information to calculate the surface contour of the object 102.

The optical sensing device includes a structured light projector 100 and a sensor 104. The structured light projector 100 is configured to project a structured light SL to the object 102. As shown in FIG. 1B, the structured light projector 100 includes a light source 110 and at least one tunable liquid crystal diffractive optical element (LCDOE) 130.

The light source 110 is configured to emit a light beam LB. The light beam LB can be, but is not limited to, inferred light. The light source 110 may be a light emitting device (LED), laser diode, an edge emitting laser, a vertical-cavity surface-emitting laser (VCSEL) or any other suitable light source capable of emitting a visible or non-visible (e.g. infrared (IR) or ultraviolet (UV)) light beam LB. In some embodiments, the light source 110 may be a single IR laser diode. In some other embodiments, the light source 110 may be an array of IR laser diodes, the number of light sources forming the light source 110 is not limited.

The at least one tunable liquid crystal diffractive optical element 130 is disposed on a path of the light beam LB and is configured to convert the light beam LB into the structured light SL, as shown in FIG. 1A, to form a structured light pattern on the object 102. The LCDOE 130 is capable of controlling the structured light pattern by controlling voltage distribution to a liquid crystal layer in the LCDOE 130.

In addition, the structured light projector 100 can further include a lens 120, which is disposed on the path of the light beam LB emitted by the light source 110. The lens 120 is disposed on at least one of the tunable LCDOE and the lens is between the light source 110 and the LCDOE 130. The lens 120 can be, but is not limited to, liquid crystal lens, solid lens or other kinds of lens with similar functions. However, in other embodiments, the LCDOE 130 may be disposed between the lens 120 and the light source 110.

The structured light projector 100 can further include a grating 140, which is disposed above the LCDOE 130. However, in other embodiments, the structured light projector 100 may not include the grating 140.

The sensor 104 is configured to sense a reflected light formed by the object 102 reflecting the structured light SL. In addition, the optical sensing device can further include a lens 106, which is disposed in front of the sensor 104 to better capture the structured light SL reflected by the object 102.

Figure 2A:
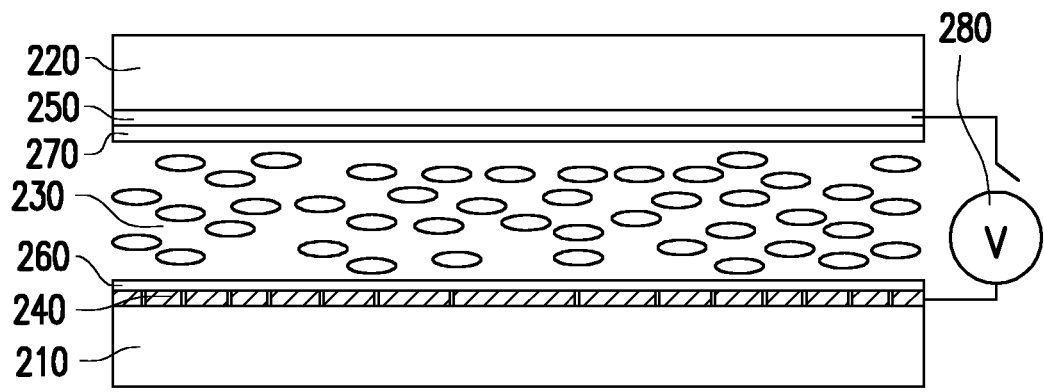
FIGS. 2A and 2B are schematic cross-sectional view of a tunable LCDOE.
Figure 2B:
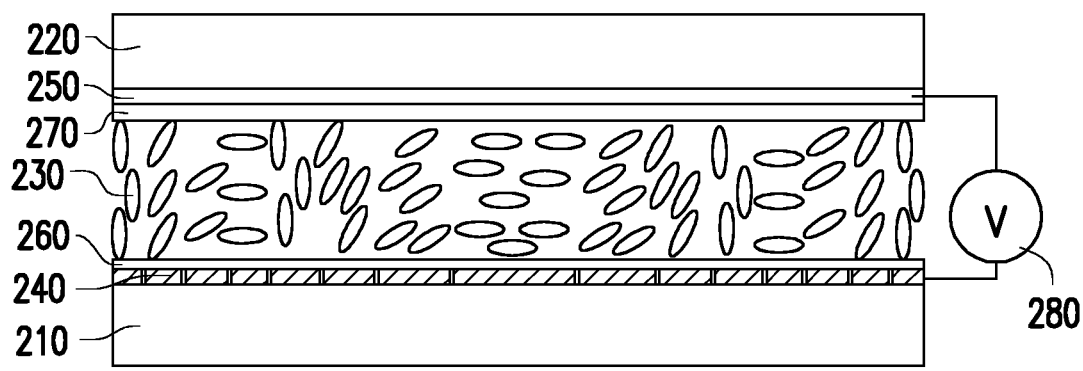

FIGS. 2A and 2B are schematic cross-sectional views of tunable LCDOE 200. The LCDOE 200 includes a first substrate 210, a second substrate 220 and a liquid crystal layer 230. The liquid crystal layer 230 is disposed between the first substrate 210 and the second substrate 20. The LCDOE 200 further includes a first electrode layer 240 and a second electrode layer 250. The first electrode layer 240 is disposed between the first substrate 210 and the liquid crystal layer 230. The second electrode layer 250 is disposed between the second substrate 220 and the liquid crystal 230. At least one of the first electrode layer 240 and the second electrode layer comprises a rectangular electrode array.

The LCDOE further includes a first alignment layer 260 and a second alignment layer 270. The first alignment layer 260 is between the first electrode layer 220 and the liquid crystal layer 230. The second alignment layer 270 is between second electrode layer 240 and the liquid crystal layer 230. The first and the second alignment layers have a surface texture to align the liquid crystal molecules to an initial direction. The materials for alignment layer used in the present embodiments may be a polymer such as polyimide, but is not limited thereto.

The first substrate 210 and the second substrate 220 may be parallel to each other. The first substrate 210 and the second substrate 220 can be made of transparent materials, such as glass, but is not limited thereto.

The first electrode layer 240 and the second electrode layer 250 can be made of transparent conductive material or non-transparent conductive material. The transparent conductive materials which can be used as the first electrode layer 240 and the second electrode layer 250 include, but is not limited to, indium tin oxide (ITO), zinc oxide (ZnO), carbon nanotube (CNT), poly poly(3,4-ethylenedioxythiophene) (PEDOT), or a combination thereof. The non-transparent conductive materials which can be used as the first electrode layer 240 and the second electrode layer 250 include, but is not limited to, metal.

The tunable LCDOE 220 can further include an external voltage supply 280. The voltage supply 280 connects to the first electrode layer 240 and the second electrode layer 250 and supplies external voltage to control the orientation of the liquid crystal in the liquid crystal layer 230.

In one of the embodiment, as shown in FIG. 2A, the external voltage supply 280 is not connected with the second electrode layer 250, and the external voltage supply 280 does not apply external voltage to the liquid crystal layer 230. The liquid crystal in the liquid crystal layer 230 is displayed in its original orientation.

In one of the embodiment, as shown in FIG. 2B, when the external voltage supply 280 is connected with the first electrode layer 240 and the second electrode layer 250, and the external voltage supply 280 applies external voltage to the liquid crystal layer 230. When the external voltage is applied to the liquid crystal layer 230 The liquid crystal in the liquid crystal layer is oriented in another different orientation, which is different from the orientation of the liquid crystal when the external voltage is not applied to the liquid crystal layer, as shown in FIG. 2A.

Figure 3A:
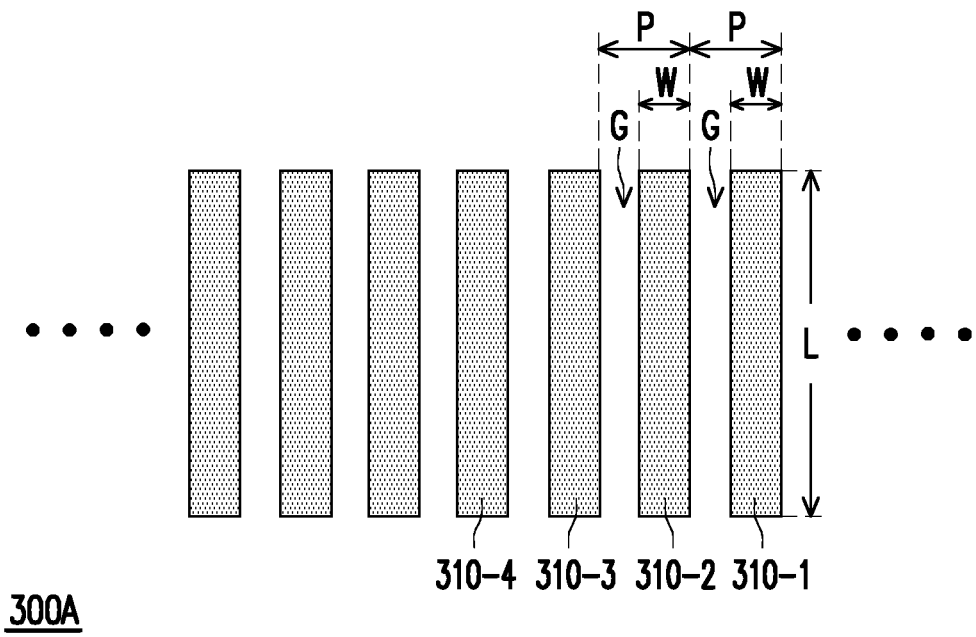
FIGS. 3A and 3B are schematic views of the structure of the electrodes of a tunable LCDOE.

FIG. 3A is a schematic view of the structure of the electrodes of a tunable LCDOE. When the light beam emitted from the light source pass through the tunable LCDOE, the diffraction pattern is generated. In one of the embodiment, the electrodes 300A, as shown in FIG. 3A, is made of a plurality of electrodes 310-1, 310-2, 310-3 and 310-4. The electrodes are made of metal stripes. The electrodes are in the rectangular shape. In this embodiment, the sizes of the electrodes are the same, with each electrode has a width w, a length L and the thickness t (not shown, the direction of thickness t is perpendicular to those of width W and length L). A plurality of gaps is formed between the electrodes. The width of the gaps between the electrodes, G, are the same. A pitch, P, is defined as the sum of the width of the electrode, w, and the width of the gap, G. The duty cycle is defined by the ratio between the width of the electrode, w, and the width of the pitch, P. The duty cycle defines the diffraction pattern generated by the LCDOE. With all the electrodes are in the same size, all the gaps have the same width, the LCDOE can generate a uniform diffraction pattern at a voltage-off state of the liquid crystal layer.

The voltage applied to each of the electrodes 310-1, 310-2, 310-3 and 310-4 is tunable. That is each of the electrodes can be applied with a specific voltage. By applying different voltage between the electrode, the orientation of the liquid crystal between the electrodes will change based on the applied voltage accordingly. When the orientation of the liquid crystal changes, the index of refraction also changes, therefore the diffraction pattern of the structured light can also be modified by changing the applied voltage to the electrodes.

Figure 3B:
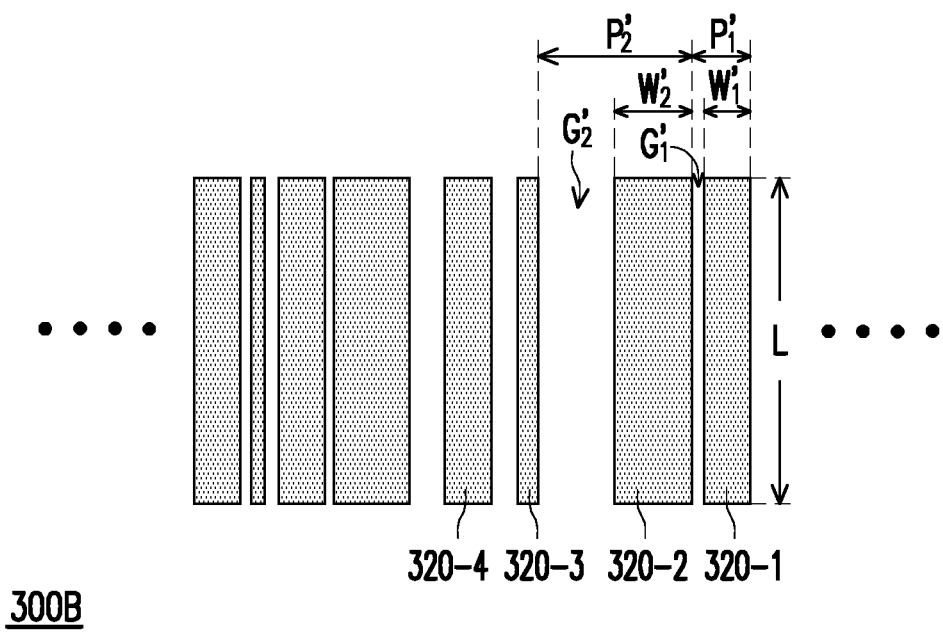

FIG. 3B is another schematic view of the structure of the electrodes of a tunable LCDOE. In one of the embodiment, as shown in FIG. 3B, the electrode layer 300B includes electrodes 320-1, 320-2, 320-3 and 320-4. The electrodes 320-1, 320-2, 320-3 and 320-4 have the same length L, but each of the electrodes has different width. For example, the electrode 320-1 has a width $W_1'$ and the electrode 320-2 has a width $W_2'$, which is not equal to $W_1'$. The each of the gaps between the electrodes have different width. For example, the gap between electrodes 320-1 and 320-2 has a width $G_1'$, and the gap between electrodes 320-2 and 320-3 has a width $G_2'$, which is not equal to $G_1'$. Therefore, each of the pitches in electrode layer 300B has different pitch width, such as $P_1'$ and $P_2'$.

With different width, different width of the gaps and different width of the duty cycle of the electrodes, as shown in FIG. 3B, the LCDOE can generate a non-uniform diffraction pattern at a voltage-off state of the liquid crystal layer.

Figure 4A:
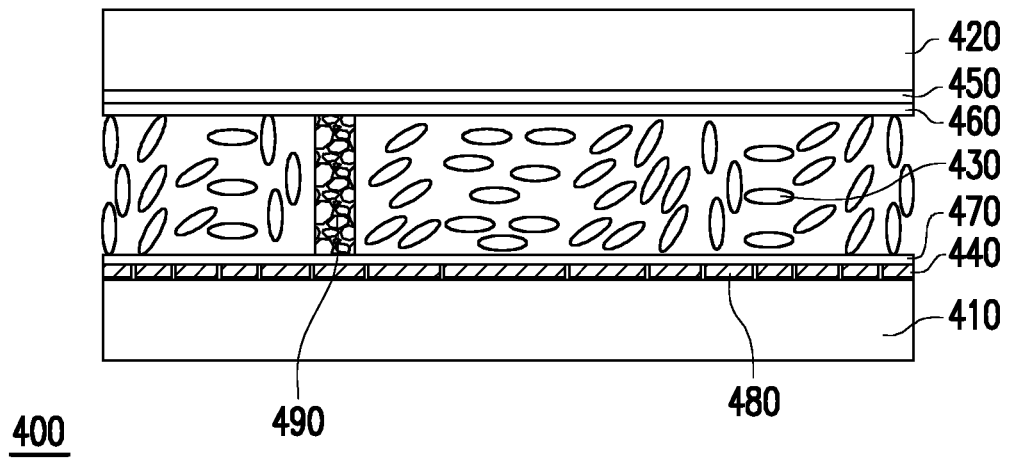
FIG. 4A is a schematic cross-sectional view of a tunable LCDOE.
Figure 4B:
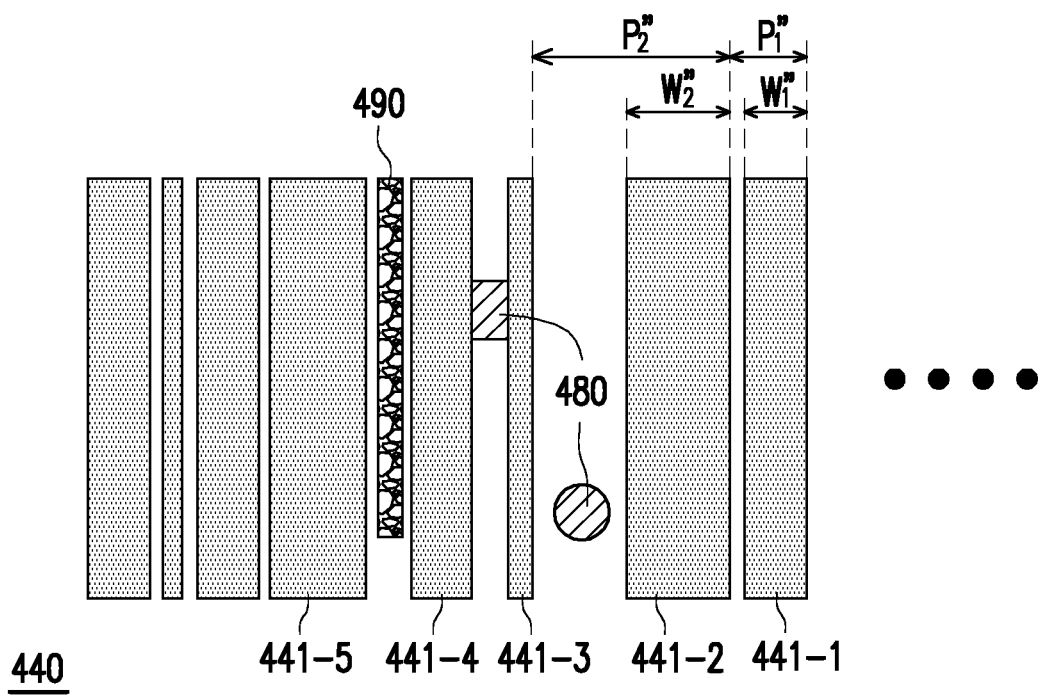
FIG. 4B is a schematic top view of the structure of the electrodes of a tunable LCDOE with metal or protrusion pattern.

FIG. 4A is a schematic cross-sectional view of a tunable LCDOE in one of the embodiment. FIG. 4B is a top view of the structure of the electrodes of a tunable LCDOE with metal or protrusion pattern.

The tunable LCDOE 400A has a structure similar to the LCDOE 200 shown in FIG. 2A, and the main difference therebetween is as follows. The tunable LCDOE 400 includes a first substrate 410, a second substrate 420, a liquid crystal layer 430, a first electrode layer 440, a second electrode layer 450, a first alignment layer 460 and a second alignment layer 470.

The first electrode layer 440 includes electrodes 441-1, 441-2, 441-3, 441-4 and 441-5. Each of the electrodes are in rectangular shape. Each of the electrodes has different width, such as $W_1''$ and $W_2''$. Each of the electrodes has a pitch with different widths between the electrodes, such as $P_1''$ and $P_2''$.

The tunable LCDOE 400 further includes a metal pattern 480 in the first electrode layer 440. In one of the embodiment, one of the metal pattern 480 is disposed between the electrodes 441-2 and 441-3. The other metal pattern 480 is disposed between electrodes 441-3 and 441-4. The shape of the metal pattern 480 can be, but not limit to, lines, dots or a combination thereof.

When the light beam emitted from the light source passing through the first electrode layer 440, the metal pattern 480 will further modify the diffraction pattern. Since the metal pattern 480 is located in a predetermined location with a predetermined size and shape, this metal pattern 480 can further modify the diffraction pattern of the structured light to a pattern fit to the pre-defined purpose.

With the metal pattern 480, there will be a diffraction pattern formed even before applying voltage to the liquid crystal layer. The diffraction pattern formed at the voltage-off state of the liquid crystal layer is called DC diffraction pattern.

The LCDOE 400 further includes a protrusion 490 in the liquid crystal layer 430. In one of the embodiment, as shown in FIG. 4B, the protrusion 490 is located between the electrodes 441-4 and 441-5. The protrusion 490 is can be, but not limit to, a spacer. The shape of the protrusion 490 can be, but not limit to, lines, dots or a combination thereof. Depending on the size, shape and color of the protrusion 490, the diffraction pattern can be further modified.

When the light beam emitted from the light source passing through the liquid crystal layer 430, the protrusion 490 will further modify the diffraction pattern. Since the protrusion 490 is located in a predetermined location with a predetermined size and shape, this protrusion can further modify the diffraction pattern of the structured light to a pattern fit to the pre-defined purpose.

With the combination of the metal patterns 480 and protrusions 490 or a combination of the both, the diffraction pattern of the structured light can be adjusted to any predetermined pattern which is best suitable for the purpose.

Figure 5:
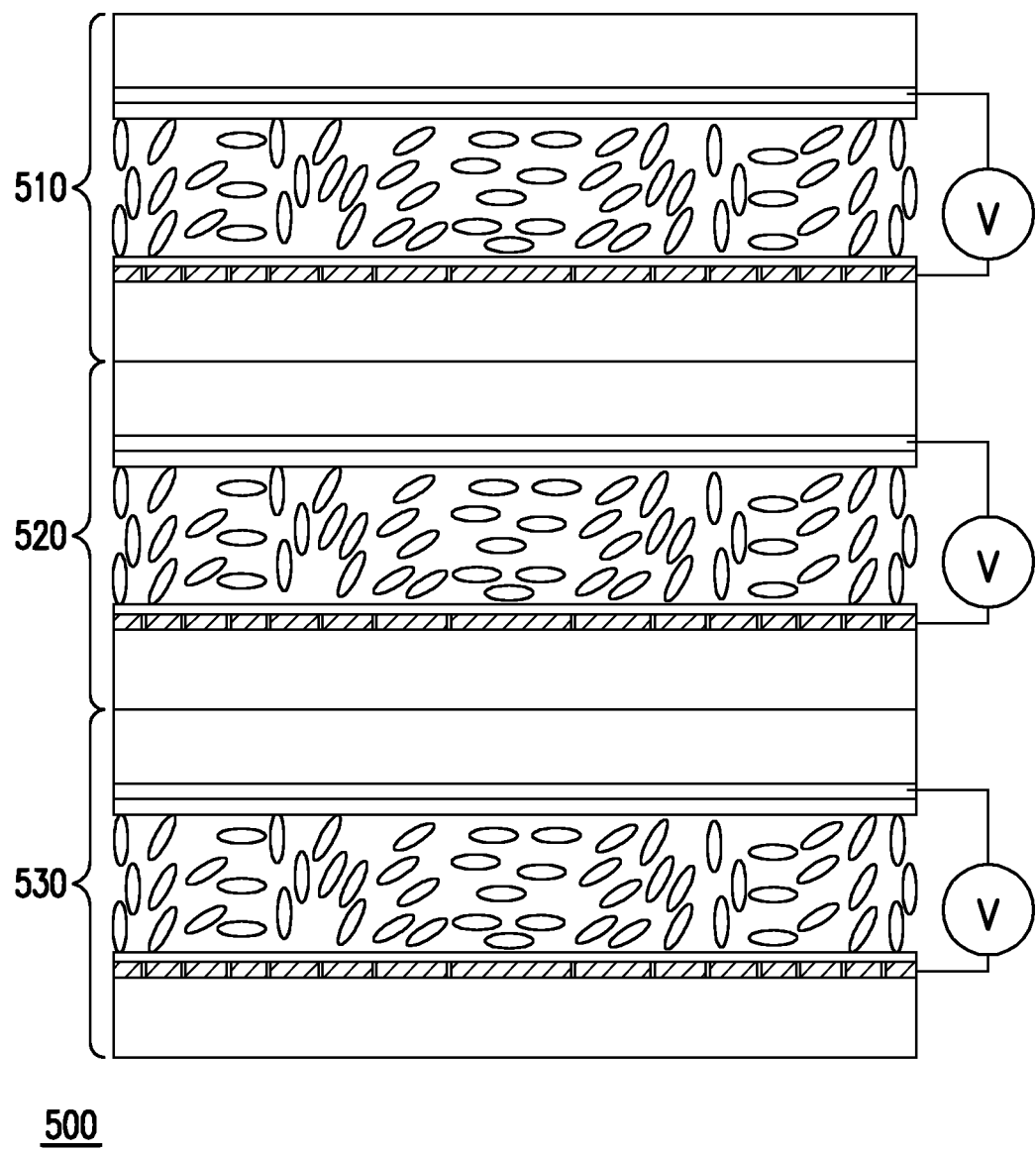
FIG. 5 is a schematic view of a cascade LCDOE.

FIG. 5 is a schematic view of a cascade LCDOE of one of the embodiment. In this embodiment, the at least one LCDOE is a stacked plurality of stacked LCDOEs disposed on the path of the light beam in sequence. In FIG. 5, the LCDOEs 510, 520 and 530 are stacked above each other vertically, and forms a stacked LCDOE 500. The number of layers of the stacked LCDOEs are not limited therein. Each LCDOE layer of the LCDOE can be applied with external voltage independently. As a result, a more complicated diffraction pattern of the structured light can be generated.

Figure 6A:
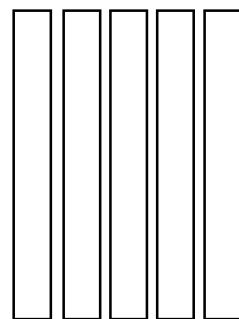
FIGS. 6A, 6B and 6C are different phase profiles of LCDOE under different applied voltages.
Figure 6B:
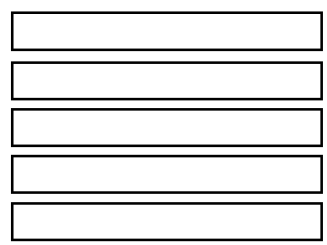
Figure 6C:
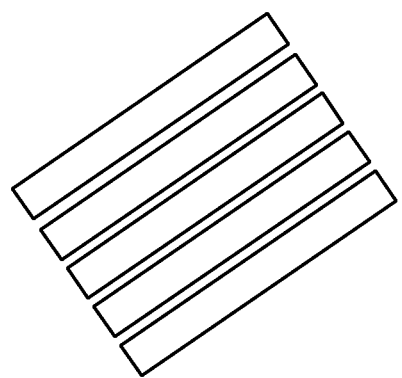

When applying voltages to each of the electrodes in the first electrode layer and the second electrode layers of the LCDOE, the orientation of the liquid crystal in the liquid crystal layer in the LCDOE is will be changed accordingly. When the light bean emitted from the light source enter the LCDOE, the phase profile of the diffraction pattern will also be changed accordingly. The phase profile is seen from the direction perpendicular to the plane of the first substrate of the LCDOE. For example, the LCDOEs 510, 520 and 530, as shown in FIG. 5, are each applied different voltage distribution to its liquid crystal layer. When applying different voltage distribution to the liquid crystal layer, the phase profile of the diffraction pattern is changed. In one of the embodiments, FIGS. 6A, 6B and 6C are different phase profiles of LCDOEs 510, 520 and 530, under different applied voltages. In FIGS. 6A, 6B and 6C, due to different applied voltage distribution to the LCDOEs 510, 520 and 530, phase profile of the diffraction pattern is at 0, 90 and 45 degrees.

The generated phase profile of the diffraction can be formed as, but not limited to, linear set, such as 0, 90 or 45 degrees, spherical set, or vortex phase.

With each of the LCDOE can generate an independent phase profile of the diffraction pattern, when the LCDOEs are stacked together, as shown in FIG. 5, people can generate any kind of desired diffraction patterns.

When the structured light diffraction pattern is projected on an object, due to the size of the object, the field of view of the diffraction pattern may be larger or smaller than the object, and the diffraction pattern cannot cover the whole area of the object. By changing the voltage distribution applied to the liquid crystal layer of the tunable LCDOE or the structured light projector, the index of refraction of the liquid crystal layer is changed, therefore the field of view of the diffraction pattern is changed accordingly.

Figure 7A:
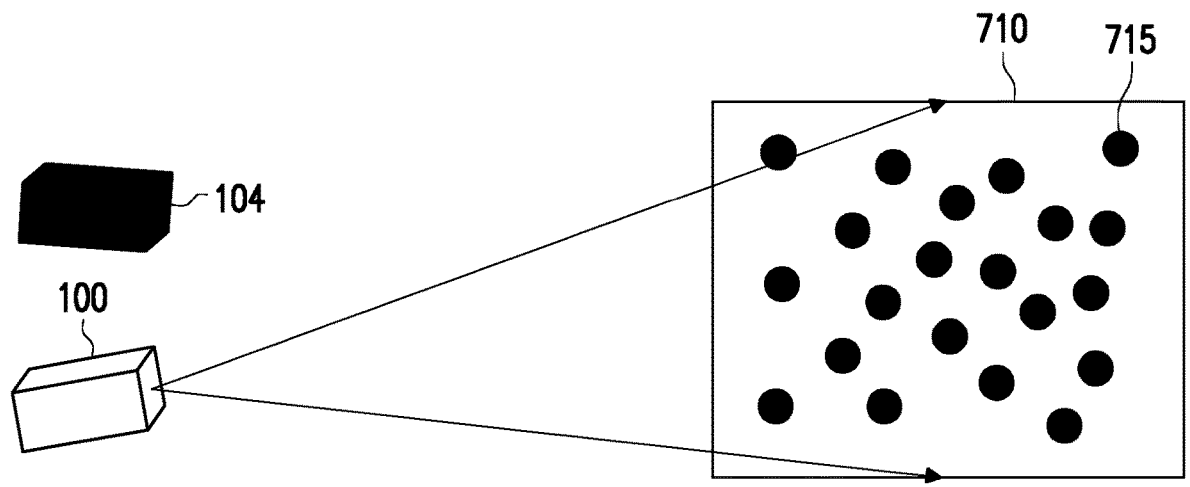
FIGS. 7A and 7B are examples of tunable field of views generated by structured light projectors according to some embodiments of the invention.
Figure 7B:
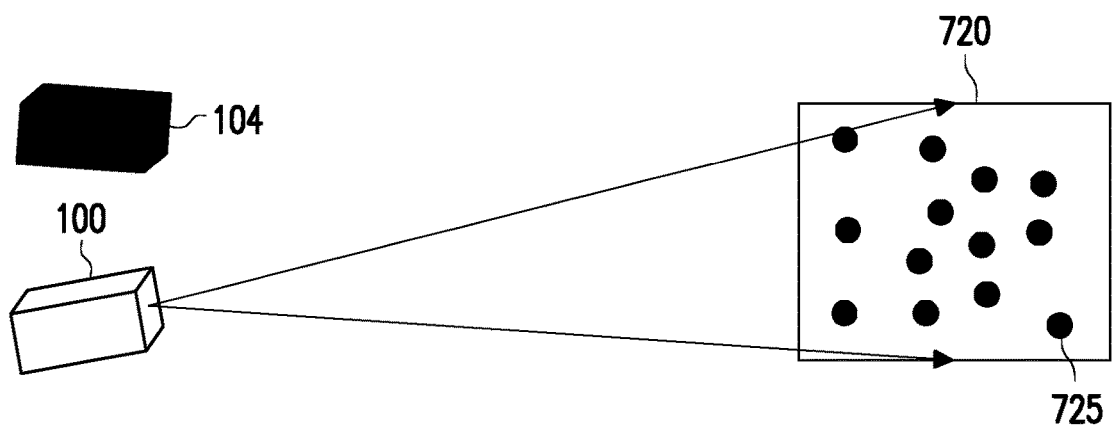

FIGS. 7A and 7B are examples of tunable field of views generated by structured light projectors according to some embodiments of the invention. In one of the embodiment, as shown in FIG. 7A, the structured light projector 100 is projecting a structured light diffraction pattern, with the field of view 710. Within the field of view 710, there are a plural of light spot 715. The reflected structured light diffraction pattern is detected by the detector 104.

By changing the voltage distribution applied to the liquid crystal layer of the LCDOE of the structured light projector 100, as shown in FIG. 7B, the index of refraction of liquid crystal layer of the LCDOE of the structured light projector 100 is changed. As a result, a new field of view 720 is generated with light spots 725 within the field of view 720. By applying different voltages to the structured light projector, the field of view of the structured light projector can be enlarged or be reduced.

The voltage distribution applied to the electrodes of the LCDOE and to the liquid crystal layer may be controlled by a controller. In an embodiment, the controller is, for example, a central processing unit (CPU), a microprocessor, a digital signal processor (DSP), a programmable controller, a programmable logic device (PLD), or other similar devices, or a combination of the said devices, which are not particularly limited by the invention. Further, in an embodiment, each of the functions of the controller may be implemented as a plurality of program codes. These program codes will be stored in a memory, so that these program codes may be executed by the controller. Alternatively, in an embodiment, each of the functions of the controller may be implemented as one or more circuits. The invention is not intended to limit whether each of the functions of the controller is implemented by ways of software or hardware.

When the structured light diffraction pattern is projected on the surface of the object, the light spot is spread on the surface of the object as the pre-determined pattern. However, due to the surface contour of the object, some area with special interest or with a more complicated contour may not have enough light spot around the area. The structured light projector can perform local optimization of the diffraction pattern to increase a resolution or the number of the light spots of the desired area by changing the voltage distribution applied to the liquid crystal layer.

Figure 8A:
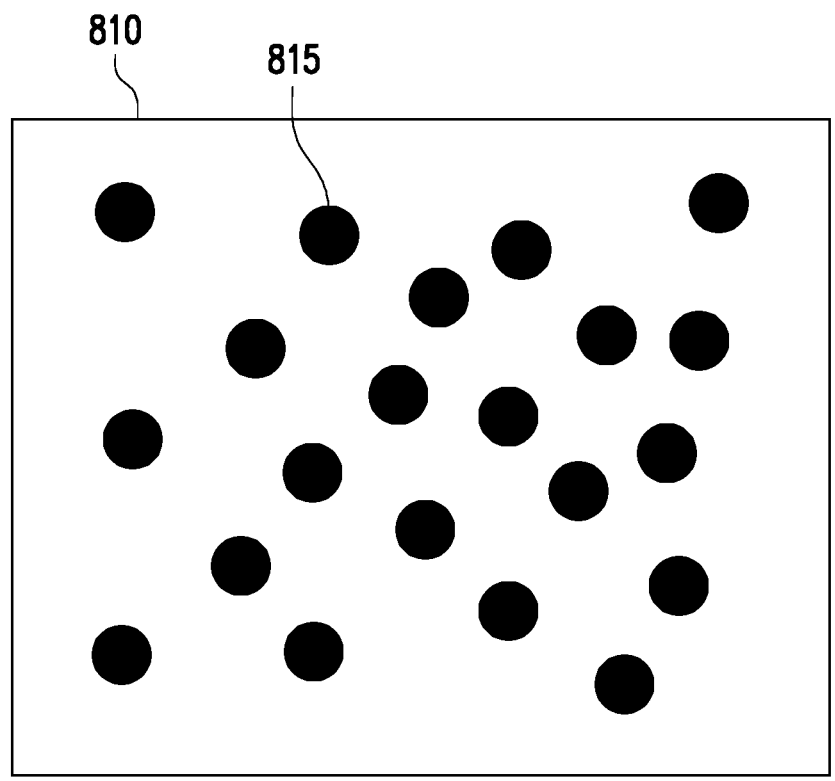
FIGS. 8A and 8B are examples of local optimization of the structured light pattern generated by structured light projectors according to some embodiments of the invention.
Figure 8B:
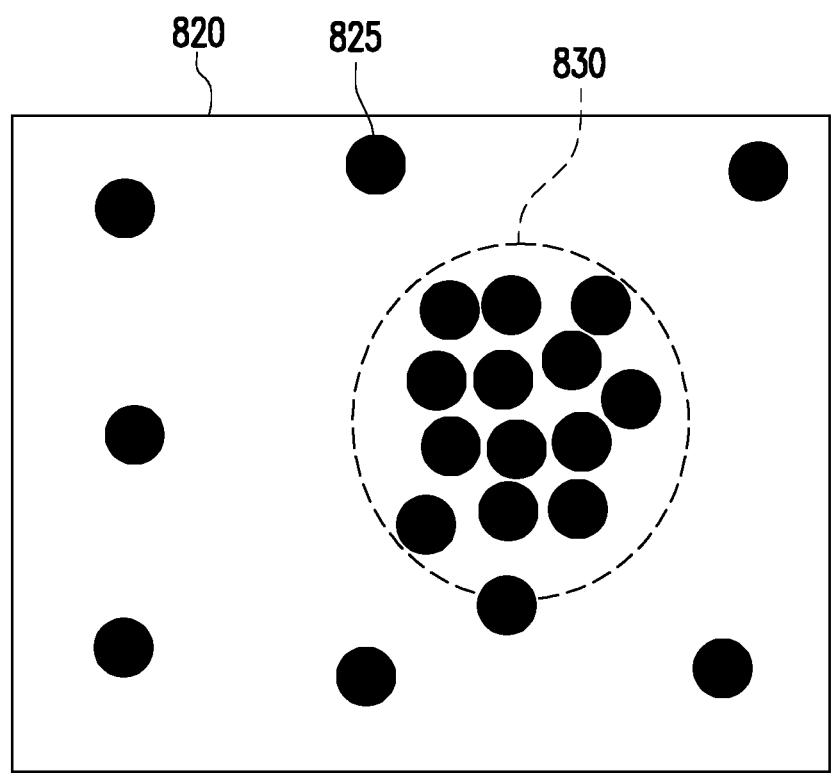

FIGS. 8A and 8B are examples of local optimization of the structured light pattern generated by structured light projectors according to some embodiments of the invention. In FIG. 8A, a plurality of light spots 815 in the field of view 810 is roughly evenly distributed. When performing local optimization of the diffraction pattern to increase the resolution by changing the voltage distribution applied to the liquid crystal layer, as shown in FIG. 8B, the light spots 825 within the field of view 820 are redistributed. The area 830 now has a higher density of light spots comparing to other areas of the field of view 820. Therefore, the area 830 can have a better resolution comparing to other areas of the field of view 820. The voltage distribution applied to the liquid crystal layer may be controlled by the aforementioned controller.

In one of the embodiments, the LCDOE is configured to respectively provide a plurality of different structured light patterns in different periods of each frame time by changing the voltage distribution applied to the liquid crystal layer, so as to increase a detection resolution of the sensor by time multiplexing.

Figure 9:
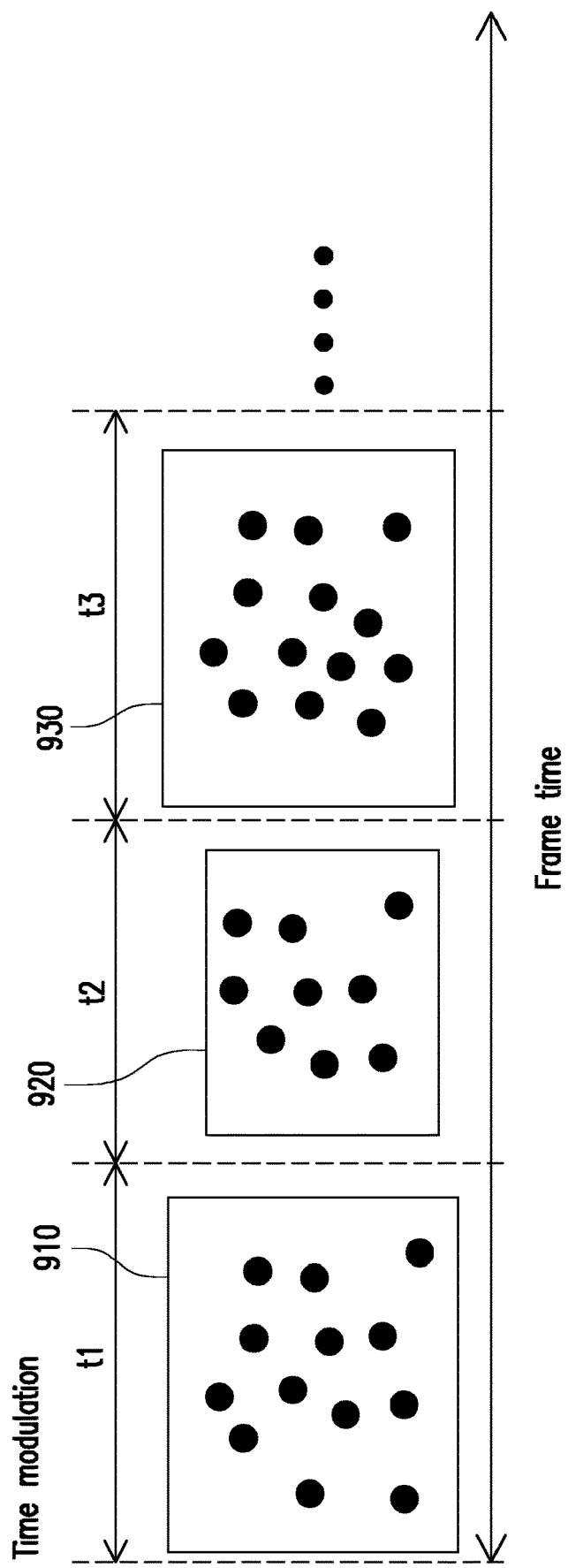
FIG. 9 is an example of time modulation of the structured light projector to scan in frame time according to some embodiments of the invention.

FIG. 9 is an example of time modulation of the structured light pattern to scan in frame time according to some embodiments of the invention. At time period t1, the LCDOE has a diffraction pattern 910 of the structured light. At time period t2, by changing the voltage distribution applied to the liquid crystal layer, a diffraction pattern 920 at time period t2 is formed and is different from the diffraction pattern 910 at time period t1. At time period t3, by changing the voltage distribution applied to the liquid crystal layer, a diffraction pattern 930 at time period t3 is formed and is different from the field of view 920 at time period t2. When different diffraction patterns are accumulated over a range of time, a more detailed diffraction pattern can be generated, which can enhance the resolution of the surface contour of the object. The voltage distribution applied to the liquid crystal layer may be controlled by the aforementioned controller.

Therefore, by changing the voltage distribution applied to the liquid crystal layer, the detection resolution of the sensor can be increased. This is very useful when applying the structured light projector to a moving object or an object with the time-dependent changing surface contour.

In one of the embodiments, the structured light projector is configured to perform a compensation to an optical error by changing the voltage distribution applied to the liquid crystal layer.

When the environment, such as the temperature, or the humidity of the air is changed, the wavelength of the light beam generated by the light source may change accordingly. This kind of change will change the diffraction pattern of the structured light accordingly. Therefore, a compensation to the optical error due to the environment change is necessary. By changing the voltage distribution applied to the liquid crystal layer of the LCDOE, the optical error due to the environment change, such as the temperature or humidity, can be corrected and the resolution of the sensor can also be improved.

In some of the embodiments, the optical error is due to the process error of the components of the optical sensing device. By changing the voltage distribution applied to the liquid crystal layer of the LCDOE, the optical error is due to the process error of the components of the optical sensing device, and the resolution of the sensor can also be improved.

In view of the foregoing, the structured light projector provided by one of the embodiments of the invention includes at least one liquid crystal diffractive optical element. Since the diffraction pattern of the structured light is tunable by changing the voltage distribution applied to the liquid crystal layer, the diffraction pattern of the structured light can be easily changed to accommodate variously kinds of environments. Besides, the structured light projector provided by one of the embodiments of the invention uses the aforementioned structured light projector, and therefore is capable of producing tunable structured light by using a simple and effective way.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical sensing device configured to detect an object or features of the object, the optical sensing device comprising:
    a structured light projector configured to project a structured light to the object and comprising:
        a light source configured to emit a light beam; and
        at least one tunable liquid crystal diffractive optical element (LCDOE) disposed on a path of the light beam and configured to convert the light beam into the structured light to form a structured light pattern on the object, the LCDOE being capable of controlling the structured light pattern by controlling voltage distribution to a liquid crystal layer in the LCDOE; and a sensor configured to sense a reflected light formed by the object reflecting the structured light, wherein the LCDOE comprises:
- a first substrate;
- a second substrate;
- a liquid crystal layer disposed between the first substrate and the second substrate;
- a first electrode layer disposed between the first substrate and the liquid crystal layer;
- a second electrode layer disposed between the second substrate and the liquid crystal layer, wherein at least one of the first electrode layer and the second electrode layer comprises a rectangular electrode array; and
- a plurality of metal patterns disposed between the first substrate and the second substrate and configured to generate a diffraction pattern at a voltage-off state of the liquid crystal layer.

2. The optical sensing device according to claim 1, whereas the first electrode layer and the second electrode layer are made of transparent conductive material or non-transparent conductive material.

3. The optical sensing device according to claim 2, wherein the first electrode layer and the second electrode layer are made of transparent conductive material including indium tin oxide (ITO), zinc oxide (ZnO), carbon nanotube (CNT), poly(3,4-ethylenedioxythiophene) (PEDOT), or a combination thereof.

4. The optical sensing device according to claim 2, wherein the first electrode layer and the second electrode layer are made of non-transparent conductive material including metal.

5. The optical sensing device according to claim 1, wherein a pitch, a duty cycle and a thickness of the rectangular electrode array are configured to provide a diffraction pattern at a voltage-off state of the liquid crystal layer.

6. The optical sensing device according to claim 5, wherein the pitch or the duty cycle of the rectangular electrode array is regular.

7. The optical sensing device according to claim 5, wherein the pitch or the duty cycle of the rectangular electrode array is irregular.

8. The optical sensing device according to claim 1, wherein the metal patterns are disposed among the rectangular electrode array.

9. The optical sensing device according to claim 1, wherein shapes of the metal patterns are lines, dots, or a combination thereof.

10. The optical sensing device according to claim 1, wherein the LCDOE is configured to change the structured light pattern by changing the voltage distribution applied to the liquid crystal layer, so as to change a detection resolution of the sensor.

11. The optical sensing device according to claim 1, wherein the structured light projector is configured to change resolutions at least between a small field of view and a large field of view of the diffraction pattern by changing the voltage distribution applied to the liquid crystal layer.

12. The optical sensing device according to claim 1, wherein the structured light projector is configured to perform local optimization of the diffraction pattern to increase a resolution by changing the voltage distribution applied to the liquid crystal layer.

13. The optical sensing device according to claim 1, wherein the LCDOE is configured to respectively provide a plurality of different structured light patterns in different periods of each frame time by changing the voltage distribution applied to the liquid crystal layer, so as to increase a detection resolution of the sensor by time multiplexing.

14. The optical sensing device according to claim 1, wherein the structured light projector is configured to perform a compensation to an optical error by changing the voltage distribution applied to the liquid crystal layer.

15. The optical sensing device according to claim 14, wherein the compensation to the optical error includes a temperature compensation of laser wavelength shift.

16. The optical sensing device according to claim 14, wherein the compensation to the optical error includes a process tolerance compensation of a de-center of light source.

17. The optical sensing device according to claim 1, wherein the at least one LCDOE is one of a plurality of stacked LCDOEs disposed on the path of the light beam in sequence.

18. A structured light projector, comprising:
a light source configured to emit a light beam;
at least one tunable liquid crystal diffractive optical element (LCDOE) disposed on a path of the light beam and configured to convert the light beam into the structured light to form a structured light pattern, the LCDOE being capable of controlling the structured light pattern by controlling voltage distribution to a liquid crystal layer in the LCDOE; and
a lens disposed on at least one of the LCDOE, wherein the lens is between the light source and on at least one of the LCDOE, wherein the LCDOE comprises:
- a first substrate;
- a second substrate;
- a liquid crystal layer disposed between the first substrate and the second substrate;
- a first electrode layer disposed between the first substrate and the liquid crystal layer;
- a second electrode layer disposed between the second substrate and the liquid crystal layer, wherein at least one of the first electrode layer and the second electrode layer comprises a rectangular electrode array; and
- a plurality of metal patterns disposed between the first substrate and the second substrate and configured to generate a diffraction pattern at a voltage-off state of the liquid crystal layer.

19. The structured light projector according to claim 18, wherein a pitch, a duty cycle and a thickness of the rectangular electrode array are configured to provide a diffraction pattern at a voltage-off state of the liquid crystal layer.

20. The structured light projector according to claim 18, wherein the LCDOE is configured to change the structured light pattern by changing the voltage distribution applied to the liquid crystal layer, so as to change a detection resolution of the sensor.

21. The structured light projector according to claim 18, wherein the structured light projector is configured to change resolutions at least between a small field of view and a large field of view of the diffraction pattern by changing the voltage distribution applied to the liquid crystal layer.

22. The structured light projector according to claim 18, wherein the structured light projector is configured to perform local optimization of the diffraction pattern to increase a resolution by changing the voltage distribution applied to the liquid crystal layer.

23. The structured light projector according to claim 18, wherein the LCDOE is configured to respectively provide a plurality of different structured light patterns in different periods of each frame time by changing the voltage distribution applied to the liquid crystal layer, so as to increase a detection resolution of the sensor by time multiplexing.

24. The structured light projector according to claim 18, wherein the structured light projector is configured to perform a compensation to an optical error by changing the voltage distribution applied to the liquid crystal layer.

25. The structured light projector according to claim 18, wherein the at least one LCDOE is a plurality of stacked LCDOEs disposed on the path of the light beam in sequence.

* * * * *